US009752623B2

(12) United States Patent
Adane et al.

(10) Patent No.: US 9,752,623 B2
(45) Date of Patent: Sep. 5, 2017

(54) INSTRUMENTED BEARING AND METHOD TO MANUFACTURE SUCH A BEARING

(71) Applicants: Thierry Adane, Tours (FR); Laurent Varnoux, Saint Avertin (FR); Olivier Verbe, Tours (FR)

(72) Inventors: Thierry Adane, Tours (FR); Laurent Varnoux, Saint Avertin (FR); Olivier Verbe, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 1 day.

(21) Appl. No.: 14/644,226

(22) Filed: Mar. 11, 2015

(65) Prior Publication Data
US 2015/0260229 A1 Sep. 17, 2015

(30) Foreign Application Priority Data

Mar. 11, 2014 (FR) ..................................... 14 52005

(51) Int. Cl.
| F16C 41/00 | (2006.01) |
|---|---|
| F16C 43/06 | (2006.01) |
| H01Q 1/27 | (2006.01) |
| G01M 13/04 | (2006.01) |
| F16C 43/04 | (2006.01) |
| F16C 19/06 | (2006.01) |

(52) U.S. Cl.
CPC .......... *F16C 41/008* (2013.01); *F16C 41/007* (2013.01); *F16C 43/04* (2013.01); *F16C 43/065* (2013.01); *G01M 13/04* (2013.01); *H01Q 1/27* (2013.01); *F16C 19/06* (2013.01); *Y10T 29/4968* (2015.01)

(58) Field of Classification Search
CPC ...... F16C 41/00; F16C 41/007; F16C 41/008; F16C 43/04; F16C 43/065; H01Q 1/27; G01M 13/04; Y10T 29/4968
See application file for complete search history.

(56) References Cited

U.S. PATENT DOCUMENTS 5,234,269 A * 8/1993 Grillo ..................... F16C 19/26
  384/446
5,382,098 A * 1/1995 Rigaux ................. F16C 19/185
  324/207.25

(Continued)

FOREIGN PATENT DOCUMENTS

DE 102010023011 A1 12/2011
WO 2006083736 A1 8/2006

*Primary Examiner* — Alan B Waits
(74) *Attorney, Agent, or Firm* — Bryan Peckjian; SKF USA Inc. Patent Dept.

(57) ABSTRACT

An instrumented rolling bearing, comprising an outer ring and an inner ring having a rolling bearing chamber delimited therebetween. Rolling bodies are positioned in the rolling bearing chamber while being maintained by a rolling bearing cage. The rolling bearing further comprises a measuring device including at least one sensor suitable for measuring at least one operating parameter of the instrumented rolling bearing, the measuring device being at least partially integrated into the rolling bearing chamber bearing cage. The measuring device further comprises at least one cable or antenna that extends along the rolling bearing cage in the rolling bearing chamber. A method for manufacturing one such instrumented rolling bearing is also disclosed.

7 Claims, 2 Drawing Sheets

(56) References Cited

U.S. PATENT DOCUMENTS

| | | | | |
|---|---|---|---|---|
| 5,622,437 | A * | 4/1997 | Alff | G01P 3/443 |
| | | | | 384/448 |
| 6,324,899 | B1 * | 12/2001 | Discenzo | F16C 19/52 |
| | | | | 340/631 |
| 7,780,357 | B2 * | 8/2010 | Varonis | G01P 3/443 |
| | | | | 324/178 |
| 8,237,431 | B2 * | 8/2012 | Fruehling | F16C 33/7859 |
| | | | | 324/173 |
| 9,206,849 | B2 * | 12/2015 | Hering | F16C 33/7843 |
| 2006/0070462 | A1 | 4/2006 | Takizawa et al. | |
| 2010/0013463 | A1 * | 1/2010 | Ozaki | G01D 5/245 |
| | | | | 324/207.2 |
| 2010/0299926 | A1 * | 12/2010 | Stitzinger | F16C 19/52 |
| | | | | 29/898.09 |

\* cited by examiner

INSTRUMENTED BEARING AND METHOD TO MANUFACTURE SUCH A BEARING

CROSS REFERENCE TO RELATED APPLICATIONS

This is a Non-Provisional Patent Application, filed under the Paris Convention, claiming the benefit of French Patent Application Number 1452005 filed on 11 Mar. 2014, which is incorporated herein by reference in its entirety.

FIELD OF THE INVENTION

The present invention relates to an instrumented rolling bearing, as well as a method for manufacturing one such instrumented rolling bearing.

PRIOR ART

Traditionally, a rolling bearing comprises an outer ring and an inner ring between which a rolling bearing chamber is delimited. The rolling bearing also comprises rolling bodies positioned in the rolling bearing chamber and maintained by a rolling bearing cage.

The rolling bearing can be associated with a measuring device, including a sensor suitable for measuring a parameter characteristic of the operation of the rolling bearing, for example a temperature, speed, acceleration, lubrication level, or vibrational or acoustic amplitude.

The measuring device is generally positioned outside the rolling bearing, for example in a housing receiving the outer ring of the rolling bearing or on a shaft receiving the inner ring of the rolling bearing. The measurements are thus influenced by the environment of the rolling bearing. Furthermore, a dedicated space must be provided to position the measuring device near the rolling bearing.

WO-A-2006/083736 discloses several embodiments of an instrumented rolling bearing, comprising a rectifier, a sensing unit, a processor, a transmitter, and a transmitting antenna. This instrumented rolling bearing has a complex construction and an important bulk.

OBJECT AND BRIEF SUMMARY OF THE INVENTION

The aim of the present invention is to propose an improved instrumented rolling bearing.

To that end, the invention relates to an instrumented rolling bearing, comprising: an outer ring and an inner ring between which a rolling bearing chamber is delimited; rolling bodies positioned in the rolling bearing chamber while being maintained by a rolling bearing cage; and a measuring device including at least one sensor suitable for measuring at least one operating parameter of the instrumented rolling bearing, the measuring device being at least partially integrated into the rolling bearing cage. The instrumented rolling bearing is characterized in that the measuring device comprises at least one cable or antenna that extends along the rolling bearing cage in the rolling bearing chamber.

Thus, the invention makes it possible to reduce the bulk of the instrumented rolling bearing including the measuring device, while improving the precision of the measurements. Advantageously, the measurements are done in the rolling bearing chamber and not outside the rolling bearing. During monitoring of the rolling bearing in use, the influence of its environment is lessened. An antenna extending along the rolling bearing cage allows to communicate with the exterior of the instrumented rolling bearing. A cable extending along the rolling bearing cage allows to connect several sensors disposed in the rolling bearing chamber.

According to other advantageous features of the invention, considered alone or in combination:

The sensor is integrated into the rolling bearing cage in an intermediate space between two rolling bodies.
The sensor is integrated into the rolling bearing cage by overmolding.
The sensor is integrated into the rolling bearing cage by clipping.
The measuring device comprises several sensors, each suitable for measuring at least one operating parameter of the instrumented rolling bearing.
The measuring device comprises a wireless transmitter integrated into the sensor.
The measuring device comprises a wireless transmitter that is separate from the sensor and is integrated into the rolling bearing cage.
The measuring device comprises at least one counterweight integrated into the rolling bearing cage.

The invention also relates to a method for manufacturing an instrumented rolling bearing as described above. The method comprises the following steps:

a) manufacturing the outer ring, the inner ring and the rolling bodies;
b) integrating at least part of the measuring device in the rolling bearing cage, the measuring device comprising at least one cable or antenna that extends along the rolling bearing cage in the rolling bearing chamber;
c) assembling the instrumented rolling bearing.

BRIEF DESCRIPTION OF THE DRAWINGS

The invention will be better understood upon reading the following description, provided solely as a non-limiting example and done in reference to the appended drawings, in which.

DETAILED DESCRIPTION OF THE PRESENT INVENTION

Figure 1:
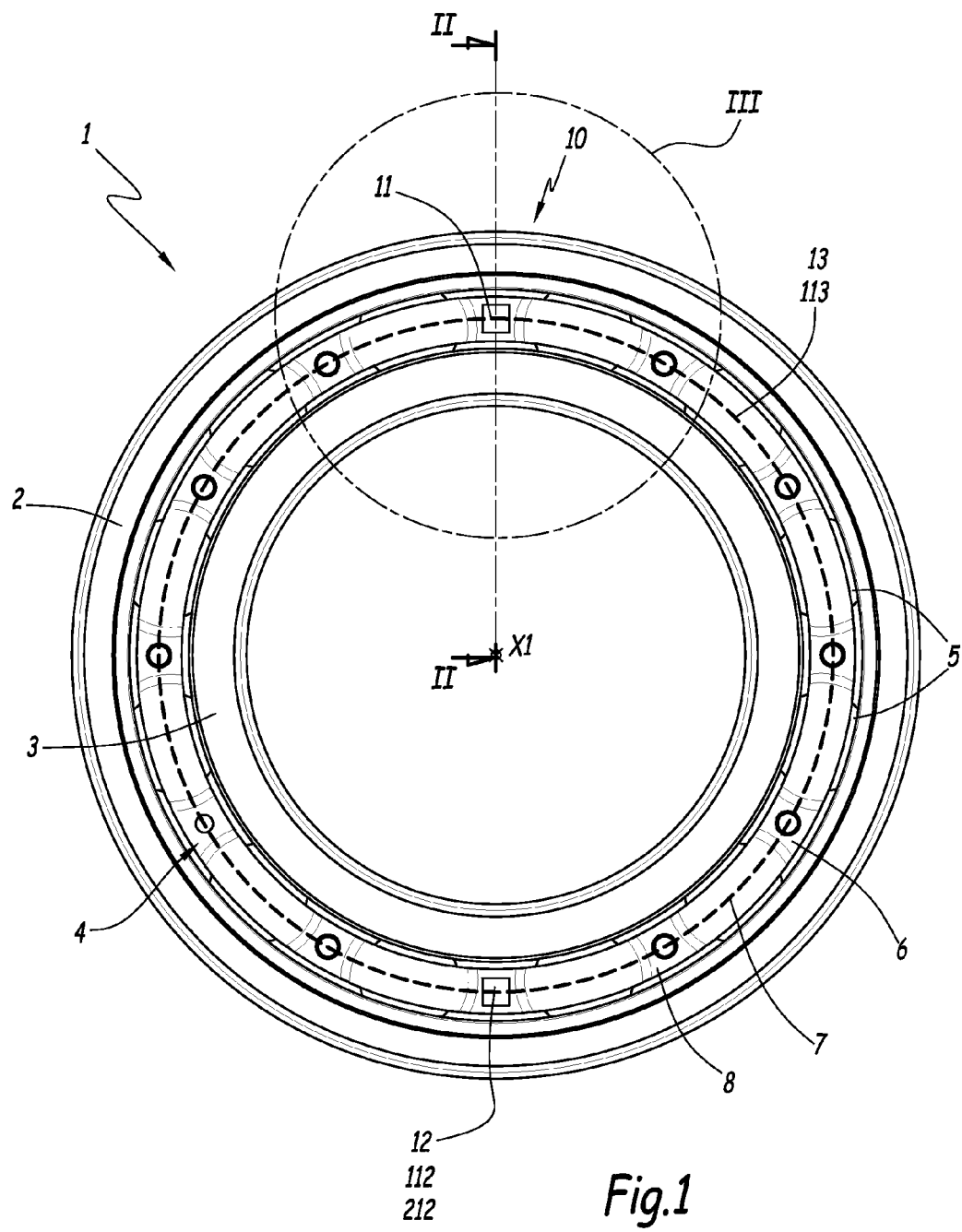
FIG. 1 is a side view of an instrumented rolling bearing according to the invention, in an axial direction.
Figure 2:
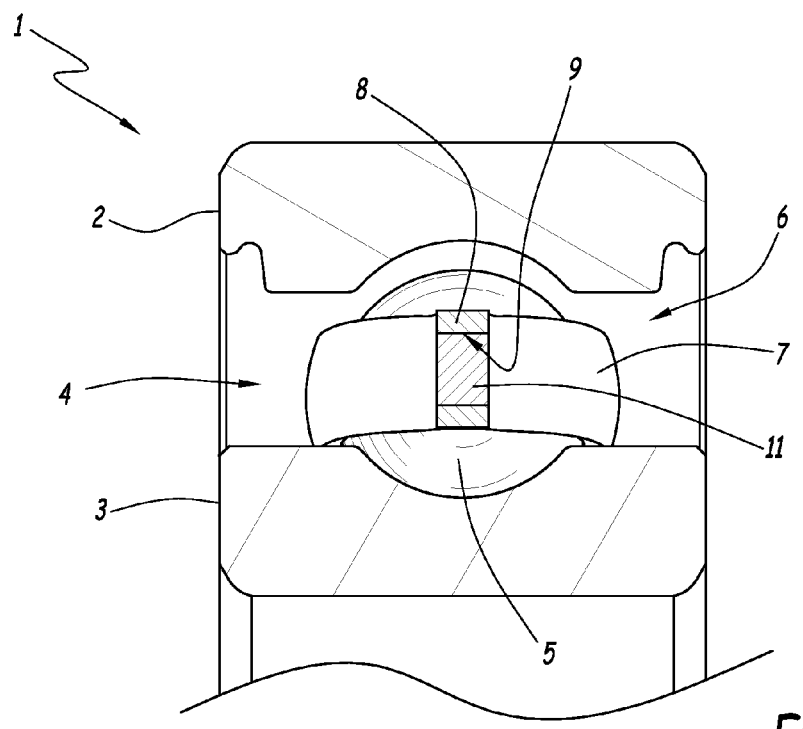
FIG. 2 is a cross-section along line II-II in FIG. 1.
Figure 3:
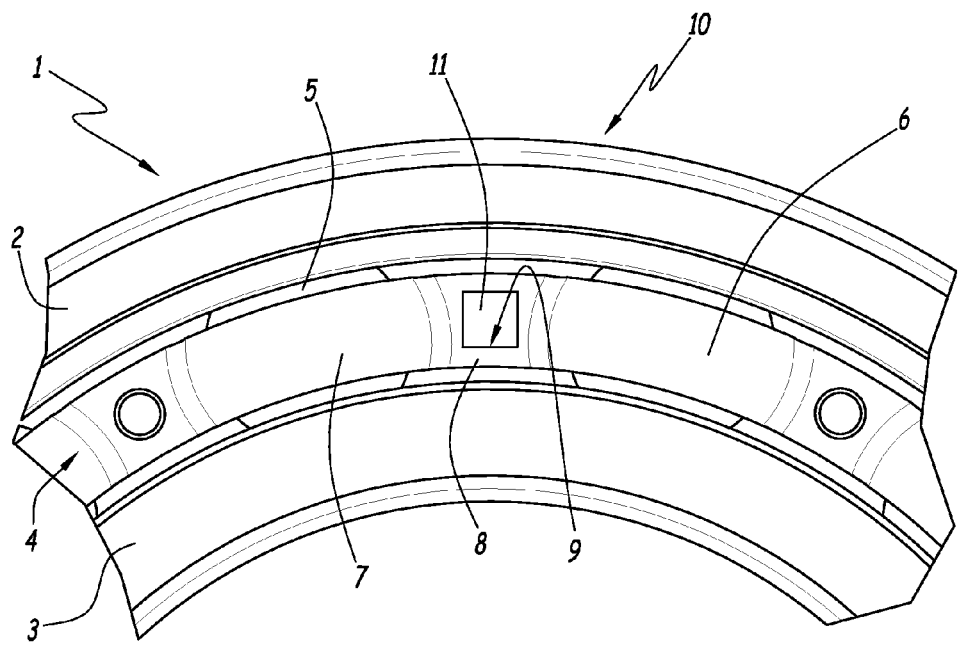
FIG. 3 is an enlarged view of detail III in FIG. 1.

FIGS. 1 to 3 show an instrumented rolling bearing 1 according to the invention.

The rolling bearing 1 comprises an outer ring 2 and an inner ring 3, between which a rolling bearing chamber 4 is defined. The rolling bearing 1 has a central axis X1, forming the relative axis of rotation of the rings 2 and 3. The rolling bearing 1 comprises rolling bearing bodies 5 positioned in the chamber 4, while being maintained by a rolling bearing cage 6.

In the example of FIGS. 1 to 3, the rolling bodies 5 are balls. Alternatively, the rolling bodies 5 can be different from balls, for example rollers or needles.

The rolling bearing cage 6 comprises maintaining parts 7 surrounding the rolling bodies 5, and intermediate parts 8 connecting the maintaining parts 7. In the example of FIGS. 1 to 3, the cage 6 can be molded in a plastic material. Alternatively, the cage 6 can be made from metal.

The rolling bearing 1 also comprises a measuring device 10, suitable for measuring at least one parameter characteristic of the operation of the rolling bearing 1.

In the context of the invention, the device 10 is at least partially integrated into the rolling bearing cage 6, as outlined below. Preferably, as in the example of FIGS. 1 to 3, the device 10 is completely positioned in the rolling bearing chamber 4 delimited between the rings 2 and 3.

The device 10 comprises a first sensor 11, a second sensor 12 and a cable 13 connecting the two sensors 11 and 12. The cable 13 is shown in broken lines in FIG. 1 only, for simplification purposes. The cable 13 extends along cage 6, all around axis X1. Preferably, in order to balance the device 10 and therefore the rolling bearing 1, the sensors 11 and 12 are positioned on either side of the axis X1, in other words distributed at 180 degrees around the axis X1. Each of the sensors 11 and 12 is suitable for measuring at least one parameter characteristic of the operation of the rolling bearing 1.

The explanations provided below for the sensor 11 are also valid for the sensor 12.

The sensor 11 may comprise one or more measuring cells, each suitable for measuring an operating parameter of the rolling bearing 1. As non-limiting examples, the parameters can be chosen from among: a temperature, a speed of rotation, an acceleration, a lubrication level, or a vibrational or acoustic amplitude. The measurements are done in the immediate environment of the sensor 11, i.e., in the rolling bearing chamber 4.

Preferably, the sensor 11 is integrated into the rolling bearing cage 6. As shown in FIG. 2, the sensor 11 is positioned in a cavity 9 provided to that end in an intermediate part 8 between two rolling bodies 5. The sensor 11 can be integrated into the cavity 9 by overmolding during the manufacture of the cage 6. Alternatively, the sensor 11 can be clipped in the cavity 9. As an alternative or addition to the clipping, the sensor 11 can be glued in the cavity 9.

According to one alternative that is not shown, the sensor 11 can be mounted on the rolling bearing cage 6, i.e., positioned on one of the maintaining parts 7 and/or on one of the intermediate parts 8 of the cage 6. For example, the sensor 11 can be glued on an outer surface of one of the intermediate parts 8.

Preferably, the measuring device 10 comprises at least one wireless transmitter directly integrated into the sensor 11. In particular, the wireless transmitter can be of the RFID (Radio Frequency Identification) transmitter type. In a same enclosure, the sensor 11 may also comprise a signal processing unit positioned between the measuring cell and the wireless transmitter, as well as an energy supply unit.

Alternatively, the measuring device 10 can comprise a sensor 11 and a wireless transmitter 112 connected by a cable 13. The transmitter 112 is separate from the sensor 11 and is integrated into the rolling bearing cage 6. In a same enclosure, the transmitter 112 may also comprise a signal processing unit and an energy supply unit.

According to another alternative, the measuring device 10 can comprise two sensors 11 and 12 with no integrated wireless transmitter, as well as a circular antenna 113 that extends along the cage 6 in the chamber 5, between the sensors 11 and 12, all around axis X1. The antenna can be fastened on the outside of the cage 6 or integrated directly into the cage, for example by overmolding.

According to another alternative, the measuring device 10 comprises a sensor 11 and a counterweight 212 integrated into the rolling bearing cage 6. To balance the device 10 and therefore the rolling bearing 1, the sensor 11 and the counterweight 212 are positioned on either side of the axis X1, in other words distributed at 180 degrees around the axis X1. When the device 10 comprises two or more sensors integrated into the cage 6, counterweights can be distributed over the perimeter of the cage 6 accordingly.

Owing to the invention, the parameters associated with the instrumented rolling bearing 1 are measured as close as possible to the functional zone of the rolling bearing 1, in the rolling bearing chamber 4, which makes it possible to obtain relevant and precise measured values. The bulk of the instrumented rolling bearing 1 is optimized. The number of wirings is reduced, in particular to supply energy and transmit data.

According to one particular application, the invention makes it possible to analyze parameters related to the lubrication of the rolling bearing 1, even when that rolling bearing 1 is protected by members insulating the rolling bearing chamber 4 from the outside (capped bearing).

The invention also relates to a method for manufacturing an instrumented rolling bearing 1. The method comprises a step a) consisting of manufacturing the outer ring 2, the inner ring 3 and the rolling bodies 5. The method also comprises a step b) consisting of integrating at least part of the measuring device 10 into the rolling bearing cage 6, the measuring device 10 comprising at least one cable 13 or antenna 113 that extends along cage 6 in chamber 5. In practice, the cage 6 can be manufactured before step b), at the same time as the elements 2, 3 and 5, or the cage 6 can be manufactured during step b), for example in the case where the elements 11, 12 and/or 13 are integrated into the cage 6 by overmolding. The method lastly comprises a step c) consisting of assembling the instrumented rolling bearing 1. Step a) can be carried out before or after step b). Step c) is carried out after steps a) and b).

The instrumented rolling bearing 1, and in particular the measuring device 10, can be configured differently from FIGS. 1 to 3 and the alternatives mentioned above without going beyond the scope of the invention.

Irrespective of the embodiment of the invention, the measuring device 10 includes at least one sensor 11 and is at least partially integrated into the rolling bearing cage 6.

Furthermore, the technical features of the different embodiments and alternatives mentioned above can be combined in whole or in part. Thus, the instrumented rolling bearing 1 can be adapted in terms of cost, functionality, bulk and performance.

The invention claimed is:

1. An instrumented rolling bearing, comprising:
   an outer ring and an inner ring having a rolling bearing chamber delimited therebetween;
   a rolling bearing cage comprising maintaining parts and intermediate parts wherein each intermediate part connects two successive maintaining parts, the rolling bearing cage further comprising a cavity located in one of the intermediate parts;
   rolling bodies positioned in the rolling bearing chamber and maintained by the maintaining parts of the rolling bearing cage;
   a measuring device comprising at least one sensor suitable for measuring at least one operating parameter of the instrumented rolling bearing, the measuring device being integrated into the rolling bearing cage such that every component of the measuring device is fixed to the rolling bearing cage, the at least one sensor being integrated with a transmitter, a processor, and an energy supply unit to form a first unit, the first unit being fixed within the cavity of the one of the intermediate parts of the rolling bearing cage such that the first unit is entirely located between two adjacent rolling bodies with respect to a circumferential direction of the instrumented rolling bearing and the first unit is completely overlapped in a radial direction and an axial direction by each of the two adjacent rolling bodies when viewing a cross section of the instrumented rolling bearing; and at least one of a cable or an antenna included with the measuring device, wherein the at least one of the cable or the antenna extends along the rolling bearing cage in the rolling bearing chamber.

2. The instrumented rolling bearing according to claim 1, wherein the sensor is integrated into the rolling bearing cage by overmolding.

3. The instrumented rolling bearing according to claim 1, the measuring device further comprising several sensors, wherein each sensor is suitable for measuring at least one operating parameter of the instrumented rolling bearing.

4. The instrumented rolling bearing according to claim 1, the measuring device further comprising at least one counterweight integrated into the rolling bearing cage.

5. The instrumented rolling bearing according to claim 1, wherein each of the outer ring and the inner ring are free of coiled metal wire thereon.

6. The instrumented rolling bearing according to claim 1, wherein the cavity extends completely through an axial length of the one of the intermediate parts, the first unit has a first unit axial length equal to the axial length of the one of the intermediate parts and wherein each of the cavity and the first unit are entirely located between a radially outer end of the one of the intermediate parts and a radially inner end of the one of the intermediate parts.

7. A method for manufacturing an instrumented rolling bearing, the method comprising steps of:

a) obtaining components of the rolling bearing, including an outer ring, an inner ring, rolling bodies, and a rolling bearing cage comprising maintaining parts and intermediate parts wherein each intermediate part connects two successive maintaining parts, the rolling bearing cage further comprising a cavity located in one of the intermediate parts;

b) obtaining a measuring device comprising at least one sensor suitable for measuring at least one operating parameter of the instrumented rolling bearing, the at least one sensor being integrated with a transmitter, a processor, and an energy supply unit to form a first unit, the measuring device comprising at least one of a cable and an antenna;

c) integrating at least part of the measuring device in the rolling bearing cage such that every component of the measuring device is fixed to the rolling bearing cage;

d) locating at least one of the cable and the antenna extending along the rolling bearing cage in the rolling bearing chamber; and e) assembling the instrumented rolling bearing such that the first unit is located within the cavity of the one of the intermediate parts of the rolling bearing cage such that the first unit is entirely located between two adjacent rolling bodies with respect to a circumferential direction of the instrumented rolling bearing and the first unit is completely overlapped in a radial direction and an axial direction by each of the two adjacent rolling bodies when viewing a cross section of the instrumented rolling bearing.

\* \* \* \* \*